Figure 1:
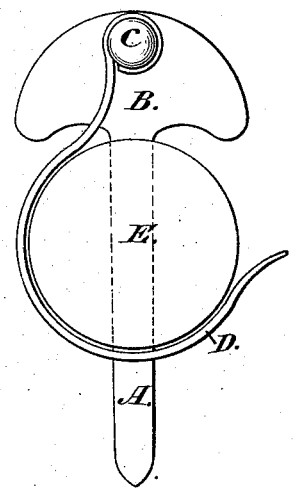
Figure 2:
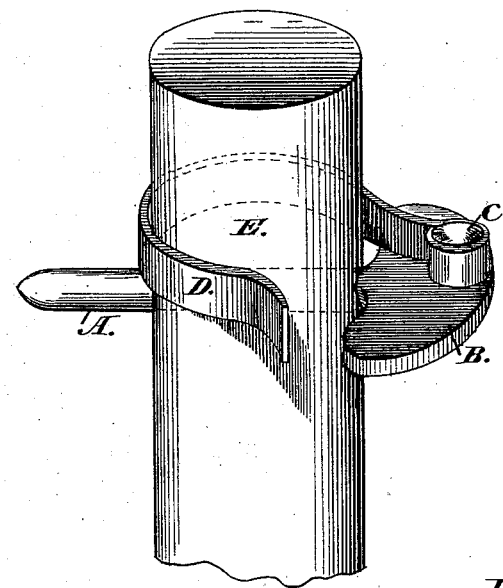

W. VARNUM.
Ox-Bow Pin.

No. 162,780.  Patented May 4, 1875.

Witnesses:
Hill H. Stone.
Geo. E. Chisley.

Inventor:
William Varnum

UNITED STATES PATENT OFFICE.

WILLIAM VARNUM, OF SHARON, VERMONT, ASSIGNOR TO JAMES E. LARKIN AND HENRY C. VARNUM, OF SAME PLACE.

IMPROVEMENT IN OX-BOW PINS.

Specification forming part of Letters Patent No. 162,780, dated May 4, 1875; application filed August 13, 1874.

*To all whom it may concern:*

Be it known that I, WILLIAM VARNUM, of Sharon, State of Vermont, have invented an Ox-Bow Pin, of which the following is a specification:

The object of my invention is to greatly facilitate and simplify the fastening and unfastening of ox-bows within the yoke or shoulder-piece, and make them secure when placed therein, which may be understood from the accompanying drawing and following description:

A is a round, straight pin, but tapered at one end, and flattened and widened at the other, so as to form a handsome pad or hilt, B, on which is erected a short standard, C, to which is attached a semicircular spring, D, by a loop in the end of said spring, the standard C aforesaid acting as a pivot therefor. Said pin A is intended to go through a small hole near the end of the bow, and be held firmly in place by said spring D, the free end of which is curved for convenience in clasping and unclasping.

I claim as my invention—

The pin A, with standard or pivot C thereon, in combination with a spring, D, substantially as and for the purpose set forth.

WILLIAM VARNUM.

Witnesses:
C. A. WILLIAMSON,
E. M. WILLIAMSON.